United States Patent [19]

Nishigaki et al.

[11] Patent Number: 4,630,826

[45] Date of Patent: Dec. 23, 1986

[54] GOLF CLUB HEAD

[75] Inventors: Susumu Nishigaki, Nagoya; Akio Ohkoshi; Torao Aozuka, both of Tokyo, all of Japan

[73] Assignee: Sony Corporation, Tokyo, Japan

[21] Appl. No.: 636,353

[22] Filed: Jul. 31, 1984

[51] Int. Cl.$^4$ .............................................. A63B 53/04
[52] U.S. Cl. .................... 273/167 H; 273/169; 273/173; 273/DIG. 7; 273/DIG. 23; 428/247; 428/408; 428/902
[58] Field of Search ............ 273/173, 169, 167 J, 273/168, 167 F, 167 H, 78, DIG. 7, DIG. 23, DIG. 29; 428/247, 408, DIG. 2

[56] References Cited

U.S. PATENT DOCUMENTS

| 700,946 | 5/1902 | Kempshall | 273/78 |
| 2,908,502 | 10/1959 | Bradstreet | 273/167 J |
| 3,455,558 | 7/1969 | Onions | 273/169 |
| 3,485,703 | 12/1969 | Long | 273/DIG. 7 |
| 3,547,445 | 12/1970 | Hardesty | 273/173 |
| 3,975,023 | 8/1976 | Inamori | 273/173 |
| 4,324,400 | 4/1982 | Tse | 273/DIG. 7 |

FOREIGN PATENT DOCUMENTS 1293767 10/1972 United Kingdom ................ 273/173

Primary Examiner—George J. Marlo
Attorney, Agent, or Firm—Hill, Van Santen, Steadman & Simpson

[57] ABSTRACT

A golf club head having a face portion for striking a ball, the face portion being formed by a complex block comprising a plurality of ceramic plates and layers of glass fibers or carbon fibers laminated alternately. By such a complex construction, the sweet spot and the center of gravity distribution as well as the hardness and roughness of a ball striking surface can be changed as desired.

5 Claims, 13 Drawing Figures

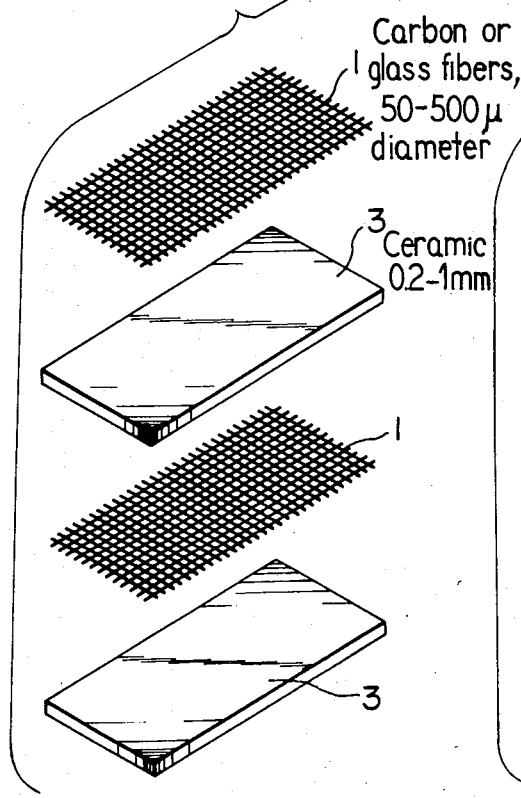
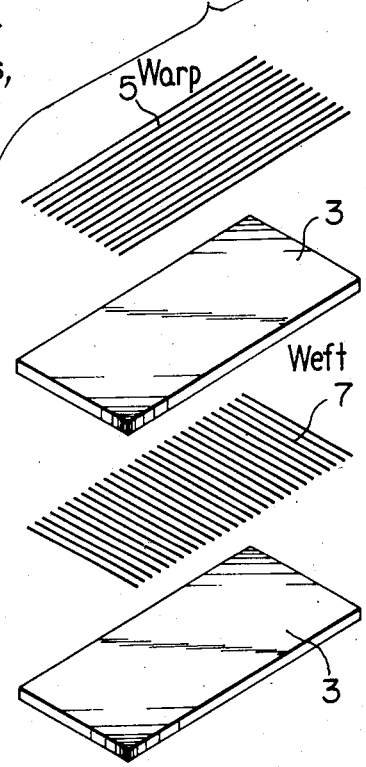

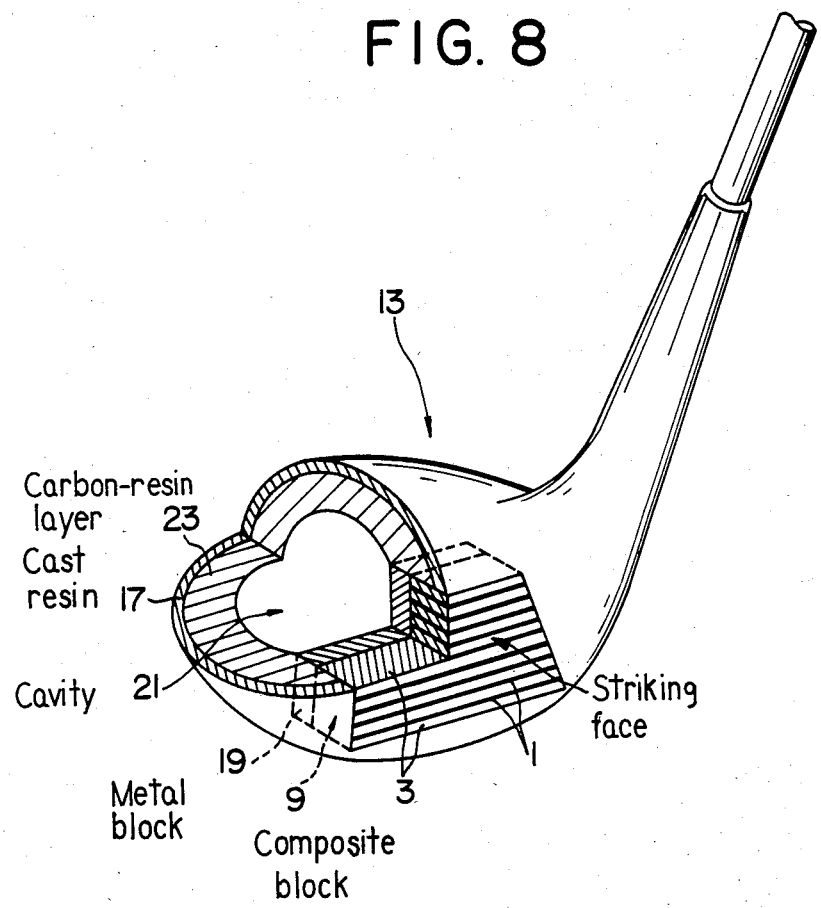

GOLF CLUB HEAD

BACKGROUND OF THE INVENTION

1. Field of the Invention

The present invention relates to a golf club head and more particularly to a golf club head using a composite material comprising ceramics reinforced with carbon fibers and/or glass fibers.

2. Description of the Prior Art

Heretofore, as head materials of wood golf clubs there have been used persimmon, metals and carbon fiber reinforced plastics. Particularly, persimmon has been considered suitable in point of specific gravity, repulsion, grain and processability, but persimmon of a good quality is becoming difficult to obtain. Metals and carbon fiber reinforced plastics have been developed and come to be used, but these materials are unsatisfactory in point of hardness and strength required of a ball striking surface, and so it has been impossible to expect a long flying distance.

As compared with such conventional materials as persimmon, metals and carbon fiber reinforced plastics, ceramics are very high in Young's modulus and hard and have an extremely high strength against compression, but are not so high in impact strength and tensile strength.

SUMMARY OF THE INVENTION

It is the object of the present invention to provide a golf club head formed of a composite material comprising ceramics and carbon fibers and/or glass fibers whereby the strength of ceramics against impact and tension is reinforced while effectively utilizing the high Young's modulus and high compressive strength of ceramics and whereby characteristics of the golf club head such as sweet spot, center of gravity distribution as well as the hardness and roughness of a ball striking surface can be changed as desired to improve performances such as the flying distance, directional property and spinning condition.

According to the present invention, there is provided a golf club head having a face portion for striking a ball, the face portion being formed by a composite block comprising a plurality of ceramic plates and layers of glass fibers or carbon fibers laminated alternately.

Examples of ceramics which may be used in the present invention include alumina ($Al_2O_3$), silicon carbide (SiC), silicon nitride ($Si_3N_4$), lead titanate ($PbTiO_3$), beryllia (BeO) and zirconia ($ZrO_2$). Since these ceramics widely range in specific gravity from 2 to 8 g/cc, the position and distribution of center of gravity can be changed as desired by arranging ceramics of different specific gravities in the surface or thickness direction. That is, a golf club easy to swing up can be obtained in conformity with the human bodily form.

At the instant of impact of a ball against a golf club head, ceramics are somewhat deformed. Since ceramics have a very high Young's modulus, in other words, their restitution time constant from deformation is very small, the ball on impact is repelled with a larger force, which leads to an increase of the flying distance.

The first step in producing the club head of the present invention is to form a composite block comprising ceramics and carbon fibers and/or glass fibers. More specifically, ceramic plates and carbon fibers and/or glass fibers impregnated with a thermosetting resin, e.g. epoxy resin, are laminated alternately in the form of a block, which block is then hot-pressed to obtain an integral composite block. This composite block is then disposed so as to face a ball striking interface of a club head and then integrated in a wrapped fashion with carbon fibers or the like, followed by casting of resin, to obtain a golf club head. The head may be internally provided with a cavity structure. Any desired cavity structure can be obtained because the ceramic plate can take any desired shape. Consequently, it is possible to obtain a wide sweet spot. Moreover, by changing the ratio of area of ceramics and carbon fibers and/or glass fibers in the ball striking surface and also by forming an appropriate unevenness on the same surface, it is possible to obtain a ball striking surface structure easy to create spin even though it is hard. Further, in the case where the club head is wholly formed of such composite block, it is possible to utilize computer aided design (CAD) and computer aided manufacturing (CAM) for automatic structural designing, assembling and outer periphery processing.

BRIEF DESCRIPTION OF THE DRAWINGS

The accompanying drawings illustrate embodiments of the present invention, in which:

FIGS. 1A and 1B are exploded perspective views showing material constructions of two kinds of composite blocks;

FIGS. 6 to 8 are partially cut-away perspective views of various club heads.

DESCRIPTION OF PREFERRED EMBODIMENTS

Figure 2:
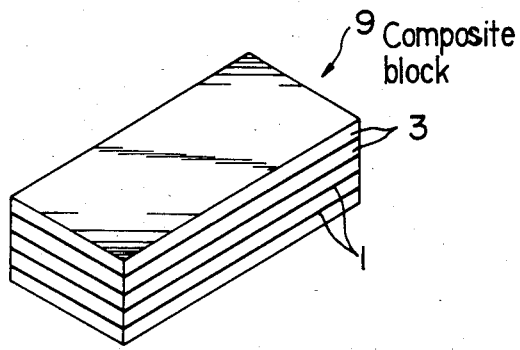
FIG. 2 is a perspective view showing an example of a composite block.
Figure 3:
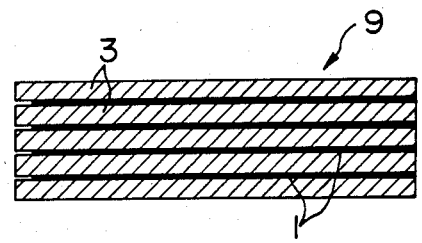
FIG. 3 is a longitudinal sectional view showing another example of a composite block.

Embodiments of the present invention will be described hereinunder with reference to the drawings.

Carbon fibers or glass fibers 1 impregnated with a thermosetting resin, e.g. epoxy resin, and ceramic plates 3 are laminated alternately as shown in FIG. 1A or 1B. The thickness of each carbon fiber or glass fiber layer and that of each ceramic plate 3 may be 50 to 500 μm and 0.2 to 1 mm, respectively. In FIG. 1A, the carbon fibers or glass fibers 1 are in the form of a closely woven cloth comprising warps and wefts, but as shown in FIG. 1B, a large number of warps 5 and wefts 7 may be arranged separately and laminated alternately while being held with the ceramic plates 3. In the case of forming a spherical cavity in the interior of the thus-formed composite block, it can be formed by successively laminating ceramic plates 3 and fibers 1 both having circular holes which are different in diameter consecutively.

Thus, by alternately laminating the carbon fibers or glass fibers 1 and the ceramic plates 3, there is formed such a composite block 9 of a predetermined size as shown in FIG. 2, which block is then rendered integral by means of a hot press. More specifically, first the composite block 9 is heated to about 100° C. to semi-harden the thermosetting resin impregnated in the carbon fibers or glass fibers and then heated to about 160° C. while being pressed for one hour or so to harden the resin completely. Through these steps, the composite block comprising alternated laminated ceramic plates and carbon fibers or glass fibers is made integral completely.

Then, one face of the complex block 9 is polished to form a ball striking surface. The ball striking surface may be flat, spherical or curved, or alternatively the ceramic plates 3 may be projected 1 mm or so from the fibers 1 to form unevenness. The formation of such unevenness makes it easier to spin a ball at the instant of impact of the club head against the ball.

Figure 4A:
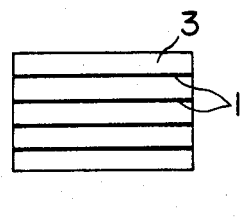
FIGS. 4A to 4E are front views of various composite blocks on the side of a ball striking surface.
Figure 4B:
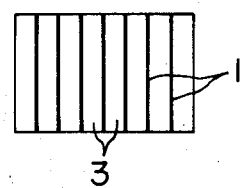
Figure 4C:
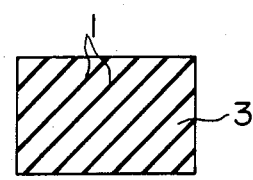
Figure 4D:
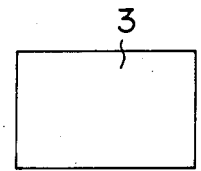
Figure 4E:
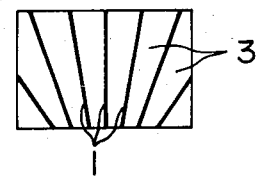

The lamination of the composite block 9 may be in various directions with respect to the ball striking surface, for example, in the direction of the height of the ball striking surface as shown in FIG. 4A, in the width direction of the same surface as shown in FIG. 4B, in an oblique direction relative to the same surface as shown in FIG. 4C, in a direction perpendicular to the same surface, namely, in a direction in which the ceramic plates go away successively from the ball striking surface, as shown in FIG. 4D, or radially from the lower center of the same surface or from a position still lower than that as shown in FIG. 4E. In the case of FIG. 4D, it is preferable to dispose the composite block so that one of the ceramic plates faces to the ball striking surface. Although in the illustrated embodiments the ball striking surface is in the shape of a rectangle for convenience' sake, it may take any other shape.

Figure 5:
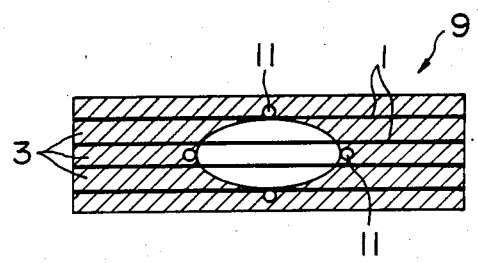
FIG. 5 is a sectional view showing a modified example of a composite block.

The ceramics in the composite block may be of a single kind or may be two or more kinds of ceramics. In the case of laminating two or more kinds of ceramics, it is preferable that a ceramic of a large specific gravity such as $ZrO_2$ or $PbTiO_3$ be used in the lower portion of the head, while a ceramic of a small specific gravity such as $Al_2O_3$ or $SiC$ be used in the upper portion of the head, whereby a club easy to swing up can be obtained. Moreover, as shown in FIG. 5, small $ZrO_2$ pieces, for example, spherical small pieces of $ZrO_2$, may be embedded in the portion surrounding a cavity of a composite block in which are laminated SiC ceramic plates, whereby the center of gravity distribution of sweet spot can be changed as desired.

Figure 6:
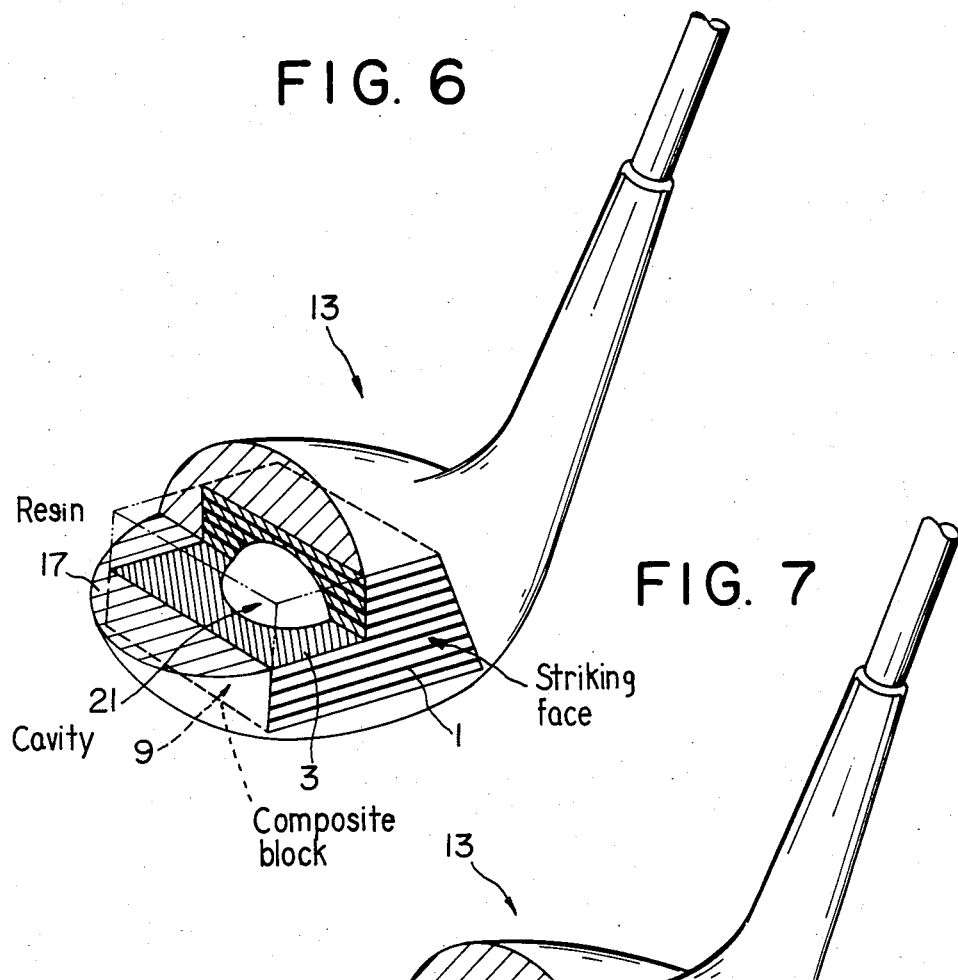

The complex block is disposed in a club head 13 in such a state as shown in FIG. 6, for example. The composite block 9 shown in FIG. 6 is internally formed with a cavity 21 and it is disposed as a core in the head 13 so that its lamination is along the height of the ball striking surface. Then, the head 13 is formed into a predetermined shape by casting of resin 17. In place of the resin 17 there may be used such a material as persimmon, metal or the like. (There also is included a structure in which the ball striking surface of a wood or metallic head is hollowed out and the composite head is embedded therein.)

Figure 7:
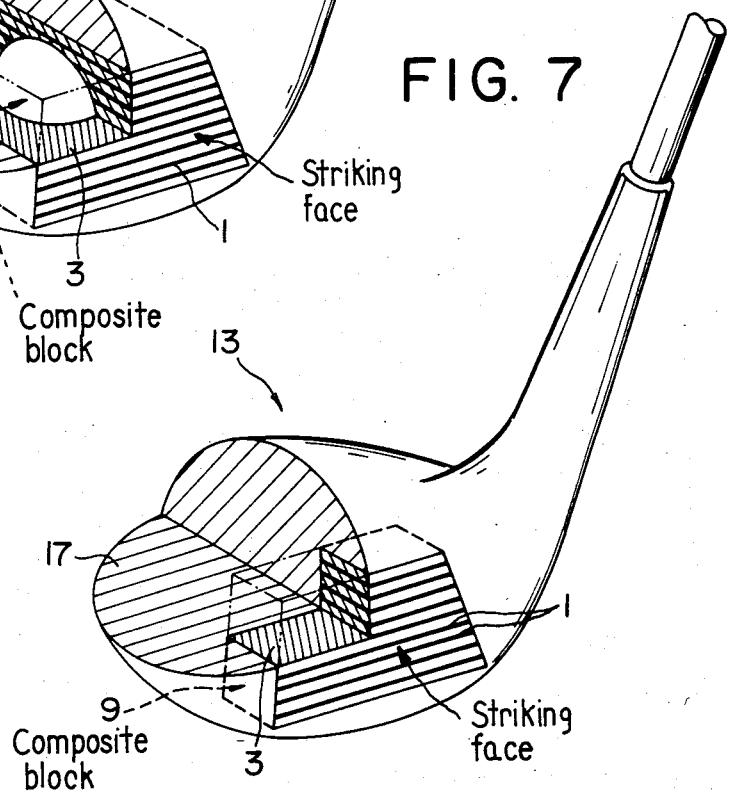

FIG. 7 shows another example, in which the composite block 9 disposed in the ball striking surface of the head does not have a cavity and it has a smaller length in the direction perpendicular to the ball striking surface of the head. The other portion of the head may be formed of a conventional material such as, for example, persimmon, metal or carbon fiber reinforced plastic.

FIG. 8 shows a further example, in which the composite block 9 disposed in the ball striking surface is of almost the same shape as that shown in FIG. 7, and a metal block 19 is disposed inside the composite block 9 to promote the effect of the latter. A cavity 21 is formed in the interior of a club head 13 and it is surrounded by the metal block 19 and a composite carbon fiber or carbon powder—resin layer 23, which in turn is surrounded by the composite block 9 and cast resin 17.

The club head may be surface-treated in a conventional manner. For example, a skin resin may be formed on its surface. In the case of forming unevenness or grooves in the composite block facing the ball striking surface, similar grooves may also be formed in the cast resin portion of the ball striking surface continuously from the composite block.

Although the above embodiments are on wood clubs, the present invention is applicable also to iron club heads. In this case, in place of the casting resin used in the above embodiments, there may be used such a material as stainless steel or a hard chromium-plate iron material in combination with the composite block of the invention.

In the golf club head of the present invention, as set forth hereinabove, the composite block comprising ceramic plates and carbon fibers and/or glass fibers is disposed so that the composite block faces to the ball striking surface. In such a construction, impact or compressive stress is exerted directly on the interior of the ceramic plated at the instant of impact of a ball against the ball striking surface, so that the high Young's modulus of the ceramics is effectively utilized directly and a long flying distance can be obtained thereby. Besides, as the member which constitutes the ball striking surface becomes more and more perfect as an elastic body, the restitution coefficient of the head against ball approaches unity or 1 and so the flying distance becomes longer. In this connection, ceramics are effective in drawing the restitution coefficient close to unity. Moreover, in addition to the very strong compressive stress of ceramics, the carbon fibers and/or glass fibers which hold therebetween both sides (one side at both ends of the composite block) of each ceramic plate can undergo a plastic deformation, so that the compressive stress is absorbed dispersedly in these fibers and does not concentrate in the ceramic plate. Consequently, even an excessive impact would not crack the ceramics, and the carbon fibers and/or glass fibers have a reinforcing effect for the ceramics. Further, the ceramic plates and the carbon fibers and/or glass fibers can be rendered integral easily, for example, by laminating these fibers impregnated with resin and the ceramic plated alternately followed by hot pressing, so it is possible to relatively simplify the manufacturing process. Additionally, the composite block can be formed in any desired shape, so in the club head of the present invention it is possible to adjust the sweet spot by providing a cavity structure, adjust the center of gravity distribution by disposing ceramic plates of different specific gravities or small ceramic pieces and further adjust the condition of unevenness on the ball striking surface, thus making it possible to obtain a high performance golf club.

What is claimed is:

1. A golf club head having a striking face portion for striking a ball, said striking face portion being formed at least in part by a composite block comprising a plurality of layers of thin ceramic plates and a plurality of layers of thin glass fibers or carbon fibers laminated in alternating layers and united into an integral composite block by a thermoset resin impregnated into said layers of glass fibers or carbon fibers.

2. A golf club head according to claim 1, wherein the thickness of said ceramic plates is in the range from 0.2 to 1.0 mm.

3. A golf club head according to claim 1, wherein the diameter of said glass fibers or carbon fibers is in the range from 50 to 500 microns.

4. A golf club head according to claim 1, wherein a major surface of one of said ceramic plates forms part of a surface which strikes a striking ball.

5. A golf club head according to claim 1, wherein said plates and layers are so laminated that the edges of said plates and layers face to a surface which strikes the ball.

* * * * *